(12) United States Patent
Abigail

(10) Patent No.: US 7,386,787 B2
(45) Date of Patent: Jun. 10, 2008

(54) COMBINED ALARM LOG FILE REPORTING USING XML ALARM TOKEN TAGGING

(75) Inventor: Shawn Gregory Abigail, Kanata (CA)

(73) Assignee: Alcatel Lucent, Paris (FR)

( * ) Notice: Subject to any disclaimer, the term of this patent is extended or adjusted under 35 U.S.C. 154(b) by 362 days.

(21) Appl. No.: 10/753,321

(22) Filed: Jan. 9, 2004

(65) Prior Publication Data

US 2005/0154977 A1 Jul. 14, 2005

(51) Int. Cl.
*G06F 15/16* (2006.01)
(52) U.S. Cl. .................. 715/234; 715/204; 715/239; 709/224; 709/225
(58) Field of Classification Search ............... 715/513, 715/514, 204, 234, 239; 707/3; 709/224, 709/225
See application file for complete search history.

(56) References Cited

U.S. PATENT DOCUMENTS

| 5,946,373 | A * | 8/1999 | Harris .................. 379/14.01 |
| 6,862,698 | B1 * | 3/2005 | Shyu ........................... 714/57 |
| 7,010,565 | B2 * | 3/2006 | Sampson ................... 709/202 |
| 2002/0007468 | A1 | 1/2002 | Kampe |
| 2002/0191258 | A1 * | 12/2002 | Ternullo et al. ............ 359/172 |
| 2003/0028577 | A1 | 2/2003 | Dorland |
| 2003/0174162 | A1 * | 9/2003 | Wu ............................ 345/736 |
| 2004/0103105 | A1 * | 5/2004 | Lindblad et al. ............ 707/100 |
| 2004/0139352 | A1 * | 7/2004 | Shewchuk et al. .......... 713/201 |

OTHER PUBLICATIONS

International Telecommunication Union, Data Communication Networks X.733, CCITT, 1992.

Lewis, David, et al., The Role of XML in TMN Evolution, IEEE 2001.

Shafer, Paul, XML-Based Network Management, Juniper Networks, 2001.

* cited by examiner

*Primary Examiner*—Stephen Hong
*Assistant Examiner*—Matthew Ludwig

(57) ABSTRACT

Alarm information reporting methods are presented. The method includes encapsulating alarm tokens constituent of a reported alarm in eXtensible Markup Language (XML) tags at communication network equipment reporting alarms. An XML aware parser associated with a network management system, extracts alarm tokens based on the encapsulating XML tags and triggers diverse network management functions based specified presence of alarm token groups in respect of a reported alarm. Each XML tag includes: a specification regarding compliance with of a standard and a recommendation, a specification regarding an alarm type, and a specification regarding an alarm tag name. Advantages are derived from a communication equipment development independence, a network management system development independence, a network management function development independence, employing a single alarm log file for concurrently reporting alarms for multiple network management functions at reduced alarm reporting overheads, an operational resilience of a network management system in respect of a newly reported alarm token in respect of an existing alarm, an operational resilience of the network management system in respect of a newly reported alarm, and only the network management functions requiring a particular no longer reported alarm token in processing an alarm being affected.

12 Claims, 1 Drawing Sheet

COMBINED ALARM LOG FILE REPORTING USING XML ALARM TOKEN TAGGING

FIELD OF THE INVENTION

The invention relates to communications network management, and in particular to alarm information reporting methods.

BACKGROUND OF THE INVENTION

In the field of communications network management alarm reporting is important both in addressing immediate fault management issues related current infrastructure failures, and in the larger context of statistics reporting and network planning.

In a managed communication network context, large numbers of communications network nodes generate very large numbers of alarms which are logged. The alarm logs are collected into log files, the log files are subsequently interpreted, and the results are displayed to network management personnel interacting with network management equipment such a Network Management System (NMS). Efficient parsing of the log files in interpreting thereof, is important because of the large number of alarms and log files. Shortcomings in this regard represent large and costly operational network management overheads in provisioning communications services.

Complications arise from a lack of consistency in respect of alarm reporting. While attempts have been made to mitigate deficiencies, current solutions are either vendor specific addressing vendor specific needs and issues, or not widely adopted. Specifically shortcomings stem from:

the absence of a common format for alarm reporting;
the requirement to address multiple network management needs concurrently;
the absence of a common format for log files;
the difficulty in timely providing documentation regarding alarm reporting and file formats employed for timely development and/or update of alarm management tools; and
the onerous requirement to provide alarm management tools to take advantage of newly reported alarm information.

In referring to a common format for alarm reporting, one understands an alarm report to include a sequenced group of tokens which specify in respect of an alarm, without being limited thereto: an alarm name, an alarm type, an alarm severity, an equipment component specification, a comment, etc. The sequence of the alarm tokens relates to the identification of the tokens. Each alarm report requires a different combination of such alarm tokens to fully convey the full meaning of the alarm and to distinguish it from others stifling any attempts towards alarm report standardization.

Network management functions, in addressing different aspects in responding to an alarm, require different sub-combinations of reported alarm tokens. Trying to address all network management functions with the same alarm report restricts independent development of network management functionality.

In order to support independent development of network management functionality, alarm reports are typically logged in different log files only with the necessary sub-combination of tokens needed to implement the network management functionality. However the practice introduces an alarm reporting overhead associated with reporting the same alarm multiple times, and further introduces complexities related to log file management.

Log files employed to support different network management functionality typically have different log file formats in respect of internal file structure including log file headers, the alarm log body, and any log file trailers. For example, the structure of a log file dictates the location where alarm reports start and end. Further alarm log file formats specify the manner in which alarm tokens are delimited such as: quote-comma delimiters wherein complex tokens containing spaces are placed between quotation marks and a coma is used between tokens, tab delimiters wherein complex tokens may include spaces and the tab character is used between tokens, etc.

Communications network equipment development includes multiple independent efforts of multiple communications network equipment vendors, wherein documentation has to be provided in respect of each effort for: each change in reporting an alarm, each new alarm, in respect of existing and newly developed communications network equipment. A development overhead is incurred in producing the documentation which is required to take into account the diverse network management functionality provided by network management systems.

The onerous requirement to provide alarm management tools to take advantage of newly reported alarm information relates to the diverse network management functions which are provided by a network management system. All network management functions have to be re-coded for each change in reporting an alarm, for each new alarm, for each change in a log file format, etc. in respect of existing and newly developed communications network equipment. In this respect, specialized log file parting code must be developed and updated with each alarm reporting change.

To date the most notable effort towards mitigating alarm reporting relates to an International Telecommunications Union Recommendation X.733 entitled "Information Technology, Open Systems Interconnection—System Management: Alarm Reporting Function" 1992 which is incorporated herein by reference. The X.733 recommendation specifies a mechanism for reliable alarm transport and relates to formatting tokens without addressing alarm report formatting nor alarm log file formatting. As a particular example the X.733 specification describes alarm token formats for:

| | |
|---|---|
| Probable cause | M; |
| Specific problems | U; |
| Perceived severity | M; |
| Backed-up status | U; |
| Back-up object | C; |
| Trend indication | U; |
| Threshold information | C; |
| Notification Identifier | U; |
| Correlated notifications | U; |
| State change definition | U; |
| Monitored attributes | U; |
| Proposed repair actions | U; |
| Additional text | U; |
| Additional information | U; |
| etc. | | wherein "M" denotes a mandatory token; "U" denotes the token as a service-user option; "C" denotes a conditional token, conditions being defined by the text describing the token; "P" denotes a token having a value which is subject to constraints imposed by CCITT Recommendation X.710/

ISO/IEC 9595. In order use the Rec. X.733 both the communications network equipment issuing alarm reports and the network management systems receiving the alarm reports have to employ the specification, agree on alarm report formats and alarm log file formation which are considered beyond the scope of the X.733 specification.

There therefore is a need to solve the above mentioned issues.

SUMMARY OF THE INVENTION

In accordance with an aspect of the invention, a method of reporting an alarm is provided. The method includes encapsulating each alarm token reported in respect of the reported alarm, between a corresponding pair of eXtensible Markup Language (XML) tags.

In accordance with another aspect of the invention, a method of parsing an alarm report is provided. The method includes identifying alarm tokens constituent of the reported alarm by inspecting XML tags encapsulating each alarm token.

In accordance with a further aspect of the invention, each XML tag specifies compliance with one of a standard and a recommendation.

In accordance with a further aspect of the invention, each XML tag specifies an alarm type.

In accordance with yet another aspect of the invention, each XML tag specifies an alarm token name.

Advantages are derived from a communication equipment development independence, a network management system development independence, a network management function development independence, employing a single alarm log file for concurrently reporting alarms for multiple network management functions at reduced alarm reporting overheads, an operational resilience of a network management system in respect of a newly reported alarm token in respect of an existing alarm, an operational resilience of the network management system in respect of a newly reported alarm, and only the network management functions requiring a particular no longer reported alarm token in processing an alarm being affected.

BRIEF DESCRIPTION OF THE DRAWINGS

The features and advantages of the invention will become more apparent from the following detailed description of the exemplary embodiment(s) with reference to the attached diagrams wherein.

Figure 1:
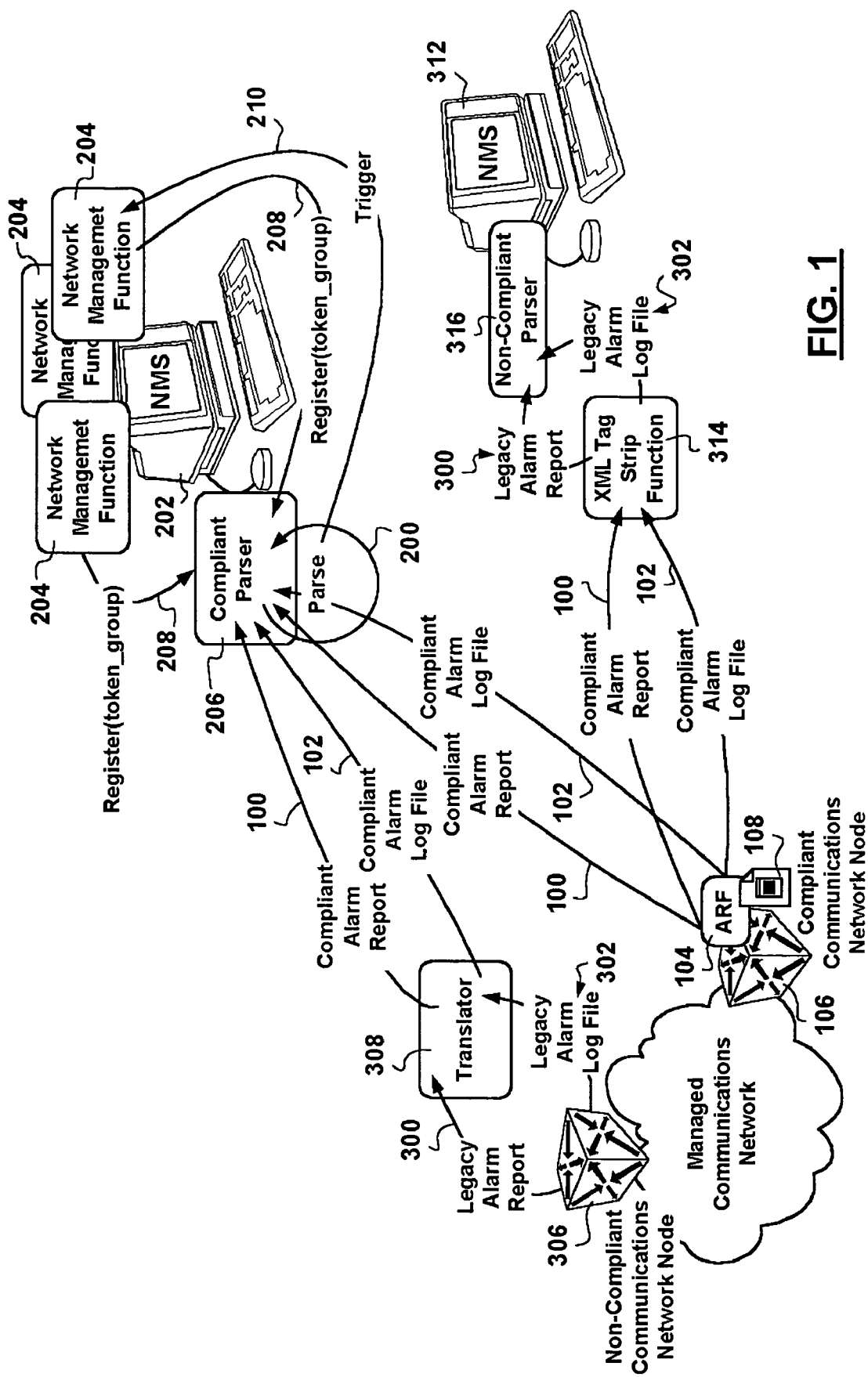
FIG. 1 is a schematic diagram showing elements exchanging alarm reporting information, in accordance with the exemplary embodiment of the invention, in a managed communication network.

It will be noted that in the attached diagrams like features bear similar labels.

DETAILED DESCRIPTION OF THE EMBODIMENTS

Solutions are sought towards easier alarm and notification management in a managed communications network context. Reference is made to FIG. 1 throughout the present description.

In accordance with as embodiment of the invention, each alarm token of an alarm report 100 is encapsulated in eXtensible Markup Language (XML) tags having a format. The format of the XML tags specify:

alarm token compliance with a specific standard/recommendation such as, but not limited to the ITU X.733 Recommendation, the X.733 alarm type, and the alarm token name, and therefore accordingly the XML tags employed specify the encapsulated token data thus aiding in parsing 200 alarm log files 102.

Such an exemplary alarm log file 102 would include:

```
<header>first log file</header>
<body>
<notification>
<_uptime_MOI>edgeNode67</_uptime_MOI>
<_uptime_Duration>00:00:02</_uptime_Duration>
</notification>
<alarm>
<X.733_collision_MOI>0.1.7.1.3</X.733_collision_MOI>
<X.733_collision_GMTtime>12:00:02<X.733_collision_GMTtime>
<X.733_collision_Availability>99</X.733_collision_Availability>
<X.733_collision_Severity>low</X.733_collision_Severity>
</alarm>
</body> .
```

Accordingly, specific XML tag definitions are published, so that communications equipment vendors implement the XML tags in alarm reporting functions 104 and therefore for inclusion in alarm log files 102.

Therefore in accordance with the exemplary embodiment of the invention, encapsulating alarm tokens within XML tags, enables employing standard XML parsing tools (200) in interpreting alarm log files 102 at a Network Management System (NMS) 204. Only the XML tag definitions are necessary in parsing alarm log files 102 generated in accordance with the exemplary embodiment of the invention.

In accordance with the exemplary embodiment of the invention, shortcomings with respect to a common format for alarm reporting are addressed by encapsulating alarm tokens within XML tags reducing stringent requirement with respect to the different combinations of alarm tokens to fully convey the full meaning of a reported alarm and to distinguish the alarm from others. The XML tags specifically specify which alarm is being reported in terms of XML tag identified tokens therefore the otherwise stringent alarm token sequencing requirements are relaxed.

In accordance with the exemplary embodiment of the invention, network management functions 204 may regard alarms to be specified by name and sub-combinations of alarm tokens reported in a single alarm log file 102, therefore reducing alarm reporting overheads. Multiple network management functions 204, registered with an alarm log file parser 206, need only specify 208 the group of alarm token names necessary to trigger thereof in support of concurrent network management functionality (204). The use of combined alarm log files 102 in reporting alarm information greatly reduces overheads associated with log file management.

In accordance with the exemplary embodiment of the invention, the XML tags employed to encapsulate alarm tokens act, as shown above, as alarm log file section separation markers enabling the parser 206 to identify the body of alarm reports in the alarm log file 102.

In accordance with the exemplary embodiment of the invention, alarm token delimiters are no longer necessary as the XML tags may encapsulate simple and complex tokens in the same unified manner.

Multiple independent communications network equipment development efforts undertaken by multiple vendors, in implementing the exemplary embodiment of the invention, need only re-code a communications network equipment alarm reporting routine (function) 104, whether ITU X.733 compliant or not, with the ability to insert XML tags into alarm reports 100 as delimiter markers for each alarm token.

The XML markers themselves may not be hardcoded in, although hardcoding XML tags into alarm reporting code (104) is not excluded as an implementation of the exemplary embodiment of the invention. In order to provide implementation flexibility, an alarm code, specific to each vendor communication network equipment type 106, may be used as a key to in querying a table 108 of alarm code indexed XML tags for use in reporting the alarm identified by the alarm code. The alarm code indexed alarm code table 108 enables XML tag specification independent of the communication network equipment development.

In accordance with the exemplary embodiment of the invention, vendor provided documentation regarding alarms reported by a particular communication network equipment 106 includes publishing the XML tags employed in respect of the alarms without a need to publish alarm codes.

Should particular legacy vendor communication network equipment 306 be no longer supported by the vendor, in accordance with another implementation of the exemplary embodiment of the invention, an alarm report translator 308 may be provided in respect of the particular legacy vendor communication network equipment 306, the alarm report translator 308 implementing current alarm report parsing techniques to identify the specific reported alarms in legacy alarm reports 300 and legacy alarm log files 302, and replace the current delimiters of the alarm reporting format with compliant alarm specific XML tags. Employing the alarm reporting translator 308 reduces development overheads in supporting legacy communications network equipment 306.

In accordance with the exemplary embodiment of the invention, network management system developers need only employ XML parsing techniques in implementing the parser 206 for the NMS 202. The XML parser 206 employs the published XML tags and alarm token format information, provided and updated independently of each other, to parse alarm reports 100 and alarm log files 102. Regardless of the sequence in which alarm tokens of a specific alarm are reported in a single alarm log file 102, and irrespective of the number of reported alarm tokens present in respect of each alarm report 100, specific network management functions 204 are triggered 210 based on the presence of specified groups of XML tag encapsulated alarm tokens concurrently and independent of the other network management functions 204. Therefore network management functionality 104 may be employed despite further development with respect to reported alarms (100).

To the extent that previously employed alarm tokens in respect of a particular alarm are no longer employed, only network management functions 204 which required the presence of the particular alarm token are affected, the rest of the network management functions 204 continue to respond to the reported alarms (100/102) as the sequence of XML encapsulated tokens is no longer important.

In accordance with the exemplary embodiment of the invention, should an alarm report a new alarm token, all network management functions 204 would continue to operate in responding to the reported alarms because the sequence of XML encapsulated tokens is no longer important as the parser 206 disregards alarm tokens encapsulated in unknown XML tags. The parser 206 need only be provided with an updated XML tag publication to recognize the new XML tags. Only network management functions 204 requiring information reported via the new alarm tokens need be updated independently of the other network management functions 204.

In accordance with the exemplary embodiment of the invention, should a new alarm be reported, all network management functions 204 would continue to operate in responding to all previously known reported alarms (100/102) as the parser 206 disregards alarm tokens encapsulated in unknown XML tags. The parser 206 need only be provided with an updated XML tag publication to recognize the new XML tags and therefore the newly reported alarm. Only network management functions 204 requiring information reported via the new alarm need be updated independently of the other network management functions 204.

In accordance with another implementation of the exemplary embodiment of the invention, should a legacy network management system 312 employing a legacy parser 316 be used in a heterogeneous communications network management context in combination with compliant network management systems 202, backwards compatibility therewith may simply be achieved by stripping 314 all XML tags and introducing appropriate alarm token delimiters between the alarm tokens.

The embodiments presented are exemplary only and persons skilled in the art would appreciate that variations to the above described embodiments may be made without departing from the spirit of the invention. The scope of the invention is solely defined by the appended claims.

I claim:

1. A method of alarm management in a communication network equipped with a network management system for monitoring operation of network equipment, the method comprising the steps of:
   a) generating at a network element a compliant alarm report in response to an alarm condition, said report including an alarm token encapsulated between a corresponding pair of extensible markup language tags;
   b) logging said compliant alarm report into a combined alarm report log file, adapted to log compliant alarm reports from a plurality of network elements of said communication network;
   c) parsing said compliant alarm report using a compliant parser equipped with extensible markup language tag specifications, including performing a look-up query based on an alarm code received in said alarm report for retrieving extensible markup language tags in respect of alarm tokens corresponding to said alarm code;
   d) at said network management system, identifying a network management function pertinent to said alarm condition based on a specified group of extensible markup language identified in said combined log file; and
   e) triggering exection of said network management function,
   wherein the pair of extensible markup language tags uniquely identify a category of said alarm condition being reported by said network element, and
   wherein said network management function is executed concurrently and independent of operation of other network management functions of said network management system.

2. A method as claimed in claim 1, wherein step a) comprises performing a look-up in an alarm code table for identifying said pair of extensible markup language tags corresponding to said alarm condition.

3. A method as in claim 1, wherein each extensible markup language tag specifies an alarm token name.

4. A method of alarm management in a communication network equipped with a network management system for monitoring operation of network equipment, the method comprising the steps of:
  a) generating at a network element a compliant alarm report in response to an alarm condition, said report including an alarm token encapsulated between a corresponding pair of extensible markup language tags;
  b) logging said compliant alarm report into a combined alarm report log file, adapted to log compliant alarm reports from a plurality of network elements of said communication network; and
  c) parsing said compliant alarm report using a compliant parser equipped with extensible markup language tag specifications, including performing a look-up query based art an alarm code received in said alarm report for retrieving extensible markup language tags in respect of alarm tokens corresponding to said alarm code,
  wherein the pair of extensible markup language tags uniquely identify a category of said alarm condition being reported by said network element,
  further comprising, when said step a) comprises, whenever said network element does not support extensible markup language tags;
  generating at said network element a legacy alarm report in response to said alarm condition; and
  logging said legacy alarm report into a legacy alarm report log file, adapted to log only alarm reports from said network element; and
  translating said legacy alarm report into said compliant alarm report including said alarm token encapsulated between a corresponding pair of extensible markup language tags.

5. A method of alarm management in a communication network equipped with a network management system monitoring operation of network elements using alarm codes compliant with various current or legacy standards, the method comprising the steps of:
  generating a compliant alarm report at each network element affected by an alarm condition, said report including an alarm code compliant with a current standard for identifying a category of said alarm condition;
  collecting said compliant alarm reports from all network elements of said communication network into a combined alarm report log file;
  parsing said common combined alarm report log file using a parser compliant with said current standard for identifying said alarm condition, including performing a look-up query based on an alarm code received in said alarm report for retrieving extensible markup language tags in respect of alarm tokens corresponding to said alarm code;
  at said network management system, identifying a network management function pertinent to said alarm condition based on a specified group of extensible markup language identified in said combined alarm report log file; and
  triggering execution of said network managemnent function,
  wherein said network management function is executed concurrently and independent of operation of other network management functions of said network management system.

6. A method as in claim 5, wherein said alarm report includes an alarm token encapsulated between a corresponding pair of extensible markup language tags.

7. A method as claimed in claim 5, wherein said step of generating comprises providing said network element with an alarm code table that specifies the extensible markup language tag to be used by an alarm reporting function for each alarm code.

8. A method as claimed in claim 5, wherein said step of generating further comprises, for a network element using alarm codes compliant with a legacy standard:
  generating a legacy alarm report and logging said legacy report into a legacy alarm log file; and
  translating said legacy report into said compliant alarm report.

9. A method of alarm management in a communication network equipped with a network management system for monitoring operation of network equipment, the method comprising the steps of:
  a) generating at a network element a compliant alarm report in response to an alarm condition, said report including an alarm token encapsulated between a corresponding pair of extensible markup language tags;
  b) logging said compliant alarm report into a combined alarm report log file, adapted to log compliant alarm reports from a plurality of network elements of said communication network; and
  c) parsing said compliant alarm report using a compliant parser equipped with extensible markup language tag specifications
  d) at said network management system, identifying a network management function pertinent to said alarm condition based on a specified group of extensible markup language identified in said combined log file; and
  e) triggering execution of said network management function,
  wherein the pair of extensible markup language tags uniquely identify a category of said alarm condition being reported by said network element, and each extensible markup language tag specifies an alarm token name, and
  wherein said network management function is executed concurrently and independent of operation of other network management functions of said network management system.

10. A method as claimed in claim 9, wherein step a) comprises performing a look-up in an alarm code table for identifying said pair of extensible markup language tags corresponding to said alarm condition.

11. A method as in claim 9, wherein step c) comprises performing a look-up query based on an alarm code received in said alarm report for retrieving extensible markup language tags in respect of alarm tokens corresponding to said alarm code.

12. A method of alarm management in a communication network equipped with a network management system for monitoring operation of network equipment, the method comprising the steps of:
  a) generating at a network element a compliant alarm report in response to an alarm condition, said report including an alarm token encapsulated between a corresponding pair or extensible markup language tags;

b) logging said compliant alarm report into a combined alarm report log file, adapted to log compliant alarm reports from a plurality of network element of said communication network; and c) parsing said compliant alarm report using a compliant parser equipped with extensible markup language tag specifications, wherein the pair of extensible markup language tags uniquely identify a category of said alarm condition being reported by said network element, and each extensible markup language tag specifies an alarm token name, further comprising, when said step a) comprises, whenever said network element does not support extensible markup language tags;

generating at said network element a legacy alarm report in response to said alarm condition; and logging said legacy alarm report into a legacy alarm report log file, adapted to log only alarm reports from said network element; and translating said legacy alarm report into said compliant alarm report including said alarm token encapsulated between a corresponding pair of extensible markup language tags.

* * * * *